3,026,738
JACK SHAFT SUPPORT
Erich Rahlson, 5818 Windsor Drive, Des Moines, Iowa
Filed June 24, 1954, Ser. No. 438,899
2 Claims. (Cl. 74—242.15)

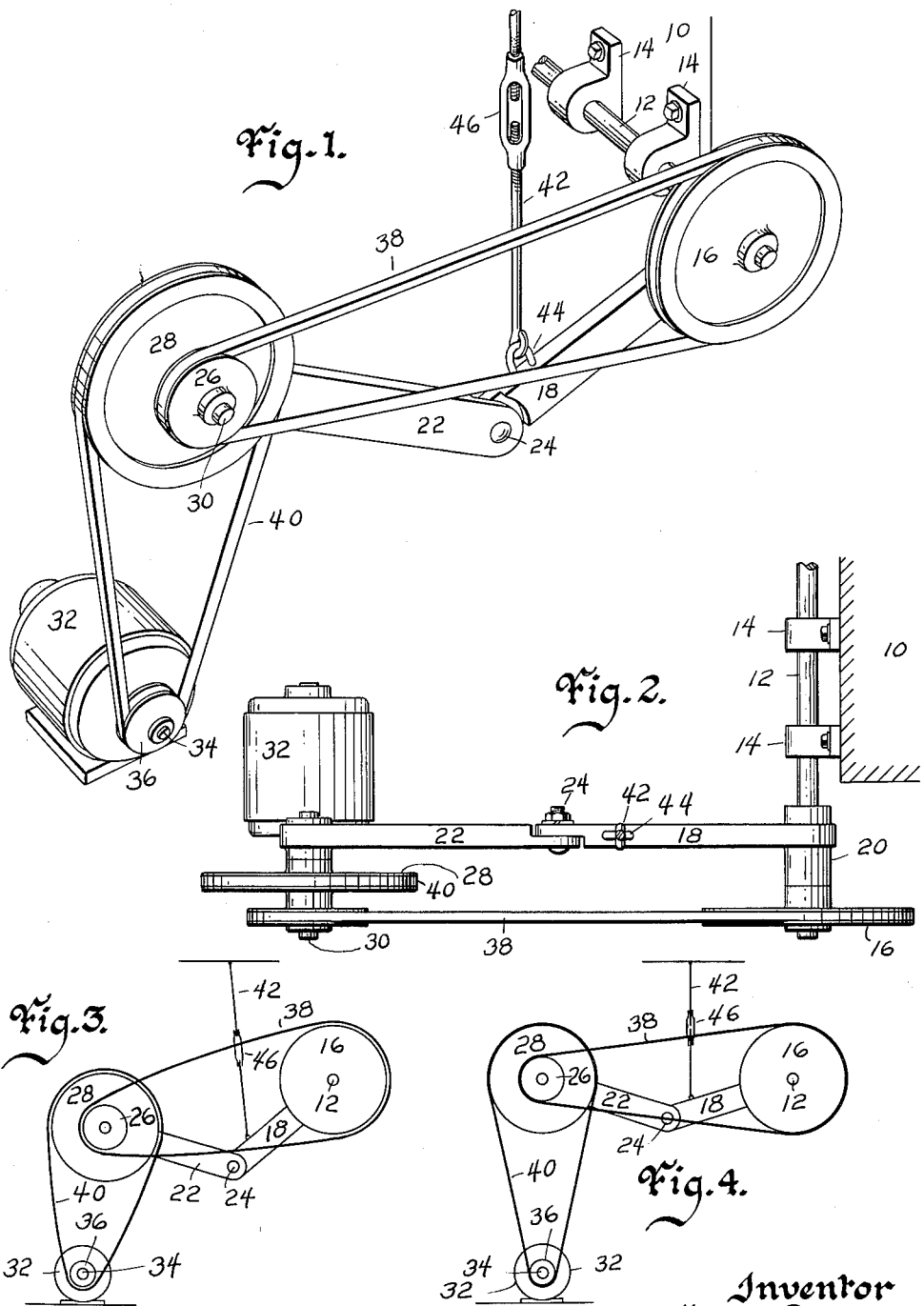

My invention is in the field of power transmission and more particularly is a form of speed reduction device. Whenever a difference in speed, usually a reduction, from a driving unit to a driven unit is required, it is necessary to employ some form of a reduction apparatus, the device known as a jack shaft being one of the simplest and most frequently used. In this basic form of speed reduction device, an electric motor, combustion engine, or any other conceivable prime mover is coupled by belt and pulleys respectively to an intermediate shaft which is the one known as a jack shaft. This jack shaft is coupled in a like manner to the final or driven shaft. The proper selection of diameters of belt pulleys and their proper order of sequence, from prime mover to final shaft, determines the end or final speed required; it is usually measured in revolutions per minute abbreviated r.p.m.

In an arrangement of power transmission using flat belts, V-belts, ropes or any similar flexible elements, it is the nature of these elements to require a certain tightness. This correct tension must be maintained for best power transmission and it is inherent in the nature of these elements to stretch and give which lessens the efficiency of the drive. It is common and sound practice, therefore, to provide means for adjusting and tightening these flexible elements. The adjusting of belt tension requires that the various elements in the system be moveable relative to each other. Conventionally, whenever a "taking up" of these elements becomes necessary, to loosen the jack shaft bearings and the motor from its base, and by moving both of these units into new locations to bring about the proper flexible element tension required for best performance. Sometimes automatic or adjustable motor bases, jack shaft take-ups or similar means are employed; but while the manual separate unit moving method is quite time consuming and often difficult to perform, the automatic structures are too costly for general use.

Specifically my invention is a jack shaft support that is both pivotable and extendible. By using my structure both of the belts that connect the elements on the jack shaft to the driving and driven elements of the power source and machine respectively with which the jack shaft is used may be tensioned quickly, easily and at the same time. The objects of my invention, then are to provide a jack shaft support that:

(1) Provides means for adjusting the tension on endless elements extending in two directions therefrom.

(2) Will provide proper adjustment for two flexible endless elements simultaneously.

(3) Uses a single adjustment to tighten both endless flexible elements engaging the rotating elements mounted on it.

(4) Can be mounted directly on the machine with which it is used.

(5) Moves and simultaneously secures the jack shaft into correct position.

(6) That makes a proper adjustment of tension of the two flexible elements used with it relatively easy to accomplish.

(7) Is compact and simple in construction.

(8) Use of which is not limited to any particular form of endless flexible element. While the objects listed specifically are the principal ones of my invention, it is my intention to include as objects of my invention any other such which may be apparent to one skilled in the art after he has read this specification, including the claims, and has examined the accompanying drawings which are briefly described as follows:

FIG. 1 is a perspective view of my jack shaft support in use supporting a jack shaft with belts and pulleys used as a speed reduction system for a motor driving a machine shown in fragment.

FIG. 2 is a plan view of the equipment shown in FIG. 1 at a slightly reduced scale from that used in FIG. 1.

FIG. 3 is a reduced side elevational schematic view of the equipment shown in FIG. 1.

FIG. 4 is a view like that in FIG. 3 except that the belts have been tightened by adjusting the jack shaft support.

The problem with which I was faced when I evolved the structure disclosed herein was to provide a simple and inexpensive but adjustable jack shaft support or some similar structure to create an inexpensive speed reduction means. I was also trying to develop such a speed reduction system that would be easily adjusted to tension the flexible elements of a jack shaft or belt-pulley speed reduction device, as I have a particular interest in using such a system on a machine that offers only a rather precarious perch to the maintenance man. The old separate motor and jack shaft adjustment technique is very awkward when used with materials handling machinery such as grain elevators which frequently have a driving motor mounted near the top of an installation. It is also difficult to install and use any conventional jack shaft support that will permit the jack shaft to be moved in two directions for proper adjustment of both flexible elements. I know of a geared speed reduction unit that can be used in such installations, but it is not always entirely satisfactory. Also, of course, it is much more expensive than a jack shaft with pulleys and belts. Also most of the conventional adjusting devices provide for only a rather small amount of adjustment. I evolved the present structure to solve all of these problems. There follows a detailed description of the structure.

Referring to the drawings in which the same part is always designated by any given reference number, I have used the number 10 to designate the machine having a driven shaft 12 rotatably mounted thereon in any appropriate manner as by the bearing brackets 14. A rotating element such as the pulley or sheave 16 is secured to the shaft 12. Also mounted on the shaft 12 is the arm 18 which is provided with the broad bearing 20 to stabilize it on the shaft 12. Motion of the arm 18 is limited by the breadth of bearing 20 to pivoting motion about the shaft 12. A second arm 22 is hingedly secured to arm 18 in any suitable manner as by the nut and bolt assembly 24. Rotatably mounted on the end of the second arm 22 are the elements 26 and 28, shown here as pulleys. These rotating elements are either made as a dual unit or otherwise secured together so that rotation of one is imparted to the other. They are rotatably secured to the arm 22 in any suitable way such as the conventional stub shaft 30. A source of power is provided by the motor 32 that has a drive shaft 34 on which a suitable element, in this case the sheave 36, is mounted. Suitable endless flexible elements such as the belts 38 and 40 are reeved over the pulleys 16 and 26 and the pulleys 28 and 36 respectively. An adjustable tension rod 42 is secured to the arm 18 in any suitable manner as by the eye 44. The tension rod is adjustable as to length by any conventional means here shown as the turnbuckle 46. The broken off end of the tension rod is secured to any suitable support (not shown). As shown in FIG. 3 the tension rod is extended to permit new belts to be installed or as would also be the case during an original installation perhaps. When the belts are in place on the pulleys, the system is ready to have tension placed on them. FIG. 4 illustrates the tightened position of the parts.

From the foregoing description of the structure I have worked out it should be clear that when the tension rod is shortened as by turning the turnbuckle, the arm 18 is pivoted about the shaft 12. As the arm 18 is physically connected to the arm 22 they both pivot. With the pivoting of the arms 18 and 22, pulleys 26 and 28 are moved away from the motor 32. Sufficient movement of the arms causes the belt 40 to begin to have tension applied to it. The tension of the belt 40 offers resistance to further pivoting movement of the arms. If the resistance to pivoting is great enough, further tension of the rod 42 tends to straighten the arm combination, since the belt 40 even if taut will permit arcing movement of the pulleys 26—28 about the pulley 36. Any extension of the arms 22—18 to produce this arcing movement of the pulleys 26—28 causes the belt 38 to have tension applied to it. The entire belt system is adjusted, therefore, by the one adjustment of the tension rod. Also of course the adjustment once attained is automatically retained by the tension rod. While I have shown and described a pair of short arms hingedly secured together, it appears that this structure is merely the most simple form of an extendible arm. In the appended claims, therefore, the arms 18 and 22 are sometimes referred to as merely an extendible arm. It is obvious also that a great variety of adjustment is possible with the structure I have described and shown above.

The principal idea practically embodied in this disclosure is the extendible arm structure that is also pivoted whereby it can be pivoted to carry one of its ends away from one point and extended to carry the same end away from another point distinct from the first point. It is also my intention to claim the pivoting of the jack shaft support about the driven shaft or about a shaft of a complete power transmission system. I further intend to claim as my invention the hinged form of extendible arm as distinct from the general idea of an extendible arm. I have described what I believe to be the most satisfactory structure for carrying my invention into effect, and I now distinctly claim and particularly point out what I believe to be my invention.

I claim:

1. In combination; a machine; a power source; a pulley connected to said power source; a shaft rotatably secured to said machine; a pulley secured to said shaft; a freely extendible arm; a bearing in one end of said freely extendible arm; said shaft receiving said bearing; a jack shaft secured to the other end of said freely extendible arm; a dual pulley on said jack shaft; belts reeved over said dual pulley and said pulleys secured to said shaft and power source respectively; and a single means secured to said freely extendible arm for both pivoting it to tighten one of said belts and thereafter, acting in conjunction with said belt tightened by pivoting, extending said freely extendible arm to tighten the other of said belts.

2. The combination of claim 1 in which said freely extendible arm consists of two rigid elements hinged together.

References Cited in the file of this patent

UNITED STATES PATENTS

| | | |
|---|---|---|
| 496,567 | Hoffmann et al. | May 2, 1893 |
| 1,388,449 | Brasseur | Aug. 23, 1921 |
| 2,075,297 | O'Brien | Mar. 30, 1937 |
| 2,287,450 | Price | June 23, 1942 |
| 2,292,580 | Moyer et al. | Aug. 11, 1942 |
| 2,458,720 | Mertz | Jan. 11, 1949 |
| 2,549,038 | Zenner | Apr. 17, 1951 |